United States Patent [19]

Aurelio

[11] Patent Number: 5,248,115
[45] Date of Patent: Sep. 28, 1993

[54] DEVICE FOR GRIPPING AND HANDLING HELICOPTERS, PARTICULARLY FOR SHIPS' DECKS, PLATFORMS AND THE LIKE

[75] Inventor: Ortelli Aurelio, Bologna, Italy
[73] Assignee: Riva Calzoni S.p.A., Milan, Italy
[21] Appl. No.: 888,182
[22] Filed: May 26, 1992

[30] Foreign Application Priority Data

Jun. 12, 1991 [IT] Italy ............... MI91A 001614

[51] Int. Cl.$^5$ .................................................. B64F 1/22
[52] U.S. Cl. .................................... 244/115; 114/261; 414/495; 414/427
[58] Field of Search ................. 244/50, 17.17, 115, 244/116; 180/14.7, 904; 414/495, 917, 427; 114/261

[56] References Cited

U.S. PATENT DOCUMENTS

| | | | |
|---|---|---|---|
| 3,830,452 | 8/1974 | Seay | 244/116 |
| 4,123,020 | 10/1978 | Korsak | 244/115 |
| 4,223,856 | 9/1980 | DiVincenzo | 180/904 |
| 4,420,132 | 12/1983 | Martin | 244/115 |
| 4,488,612 | 12/1984 | Patterson | 244/50 |
| 4,529,152 | 7/1985 | Bernard |  |
| 4,834,321 | 5/1989 | Granger | 244/115 |
| 5,098,035 | 3/1992 | Bernard et al. | 180/904 |

FOREIGN PATENT DOCUMENTS 2802231 7/1978 Fed. Rep. of Germany .
2462341 2/1981 France .
1045568 10/1966 United Kingdom .

*Primary Examiner*—Galen Barefoot
*Attorney, Agent, or Firm*—Herbert Dubno

[57] ABSTRACT

A device for gripping, handling and transporting helicopters, particularly on board ships, platforms and the like, includes a pair of gripping units located parallel to a longitudinal axis of the vessel and capable of moving transversally to the axis and parallel to one of the respective transverse guides, and under the action of drive units which are independent of one another, and traversing units parallel to the longitudinal axis of the vessel, and connected with corresponding longitudinal guides, along which the former are guided under the action of further independent drive units upon cocking the helicopters wheels.

9 Claims, 5 Drawing Sheets

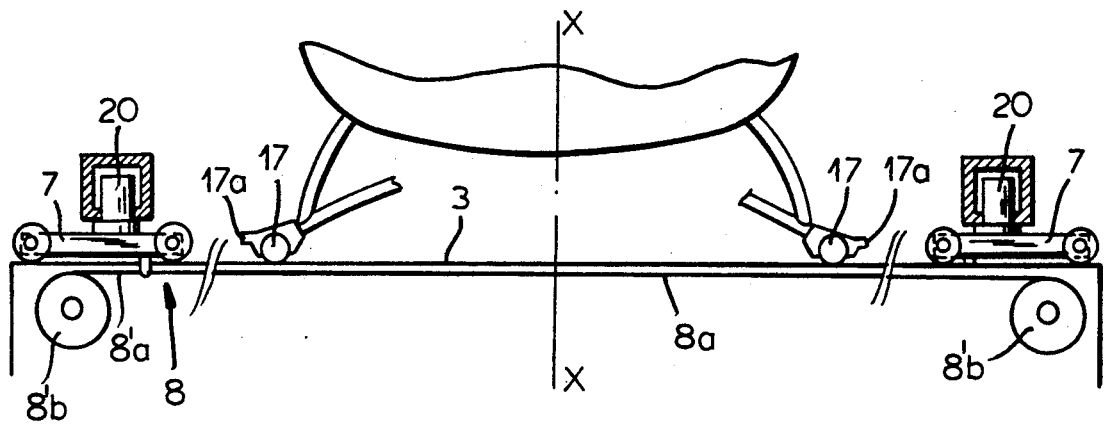
FIG.2a
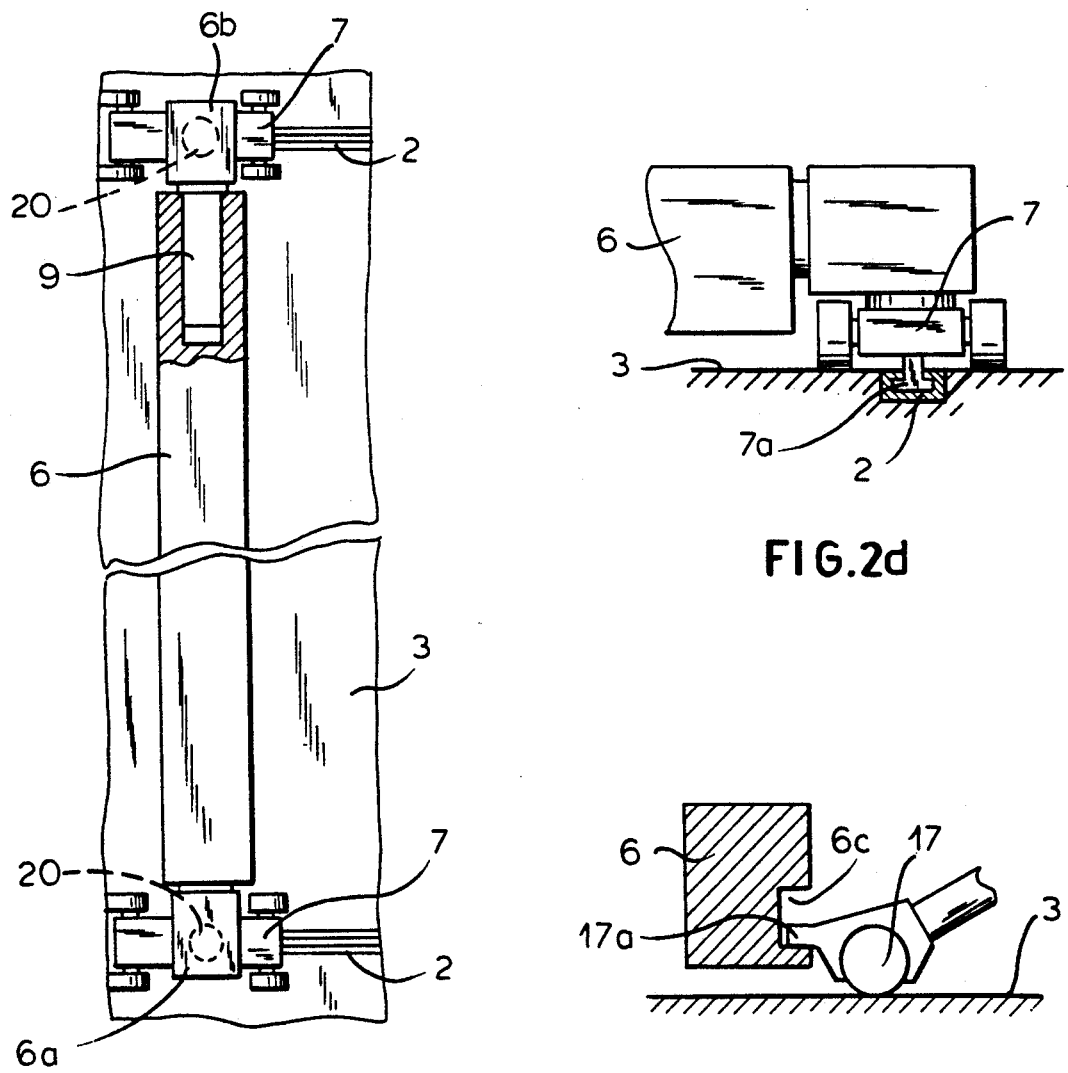
FIG.2b
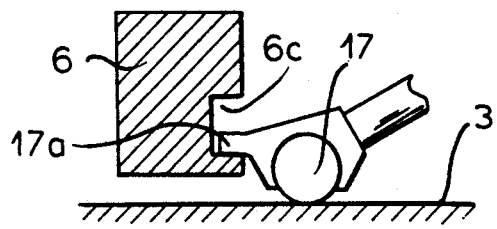
FIG.2d
FIG.2c

DEVICE FOR GRIPPING AND HANDLING HELICOPTERS, PARTICULARLY FOR SHIPS' DECKS, PLATFORMS AND THE LIKE

FIELD OF THE INVENTION

This invention relates to a device for gripping, handling and transporting helicopters, particularly on board ships, platforms and the like.

BACKGROUND OF THE INVENTION

The widespread use of helicopters on board ships has created a need for means to move a helicopter from a landing area located on the deck into a hangar situated on the deck of the same ship.

Such operation is, however, extremely complicated because of numerous factors which bring about high unpredictability with regards to both the landing position on the deck and the relative position between the helicopter, the deck and the entrance to the hangar. Additionally, the operation should be capable of being carried out in a manner ensuring full safety both for the helicopter and for the ship's crew, even under extremely hazardous conditions involving, for example, high winds and/or heavy seas which cause pitching and rolling of the vessel, resulting in instability of the helicopter.

There are also known certain technical solutions which provide for a handling truck on the deck to which the helicopter is hitched on landing so that such truck may, by means of suitable devices, maneuver the helicopter to the correct position for moving it into the hangar. Such devices, however, have numerous disadvantages, including the need for a truck to be available on deck at the time of landing and for a link to be made thereto during the landing phase, which is undesirable because of the danger posed by presenting an obstacle to the helicopter and requiring a linking operation during the landing phase, especially under unfavorable weather conditions. Furthermore, once the helicopter has landed and been secured such devices, while holding the helicopter, allow it to rotate on its axis with obvious risks of unbalance and tilting.

OBJECTS OF THE INVENTION

It is therefore an object of the present invention to provide an apparatus for moving a helicopter from a position within a well-defined landing area on a ship's deck to a position inside a hangar located on the deck of the ship. Still another object is to provide such apparatus which provides a reliable towing of the helicopter to the hangar regardless of the position of the helicopter within the landing area and without participation of any handling crew.

SUMMARY OF THE INVENTION

The apparatus according to the invention can be monitored automatically and/or manually and can be used for helicopters of both wheel-mounted and skid-mounted types.

The device for gripping, handling and transporting helicopters, particularly on board ships, platforms and the like according to the invention includes a pair of gripping units located parallel to the longitudinal axis of a vessel and capable of moving transversely in relation to such axis, the units being made integrally with corresponding transverse guides, and capable of assuming a tilted position, but parallel with one another, in relation to such guides, under the action of drive units independent of one another. The gripping units are displaceable by further traversing units parallel to the longitudinal axis of the vessel and formed integrally with corresponding longitudinal guides, under the action of further independent drive units. Combined gripping and lifting assemblies are integral with such gripping and traversing units in order to stabilize and lift the helicopter from the deck, and a means is provided for operating and controlling the entire device both manually and automatically. The device provides a possibility of taking the helicopter from the landing area regardless of its position in relation to the deck and the hangar, to align it with at least one of the longitudinal guides in order to move it into the hangar.

BRIEF DESCRIPTION OF THE DRAWING

The above and other objects, features and advantages of my invention will become more readily apparent from the following description, references being made to the accompanying highly diagrammatic drawing in which:

FIG. 2a is a diagrammatic elevational cross-sectional view of the helicopter gripping unit with the relevant handling device;

FIG. 2b is the skid gripping unit in a cutaway plan view;

FIG. 2c is a partial cross-sectional view of the gripping unit attached to the skid of the helicopter;

FIG. 2d is a detail of the attachment of the gripping units to the guides;

FIG. 3b is a plan view of the wheel gripping unit according to FIG. 3a;

SPECIFIC DESCRIPTION

Figure 1:
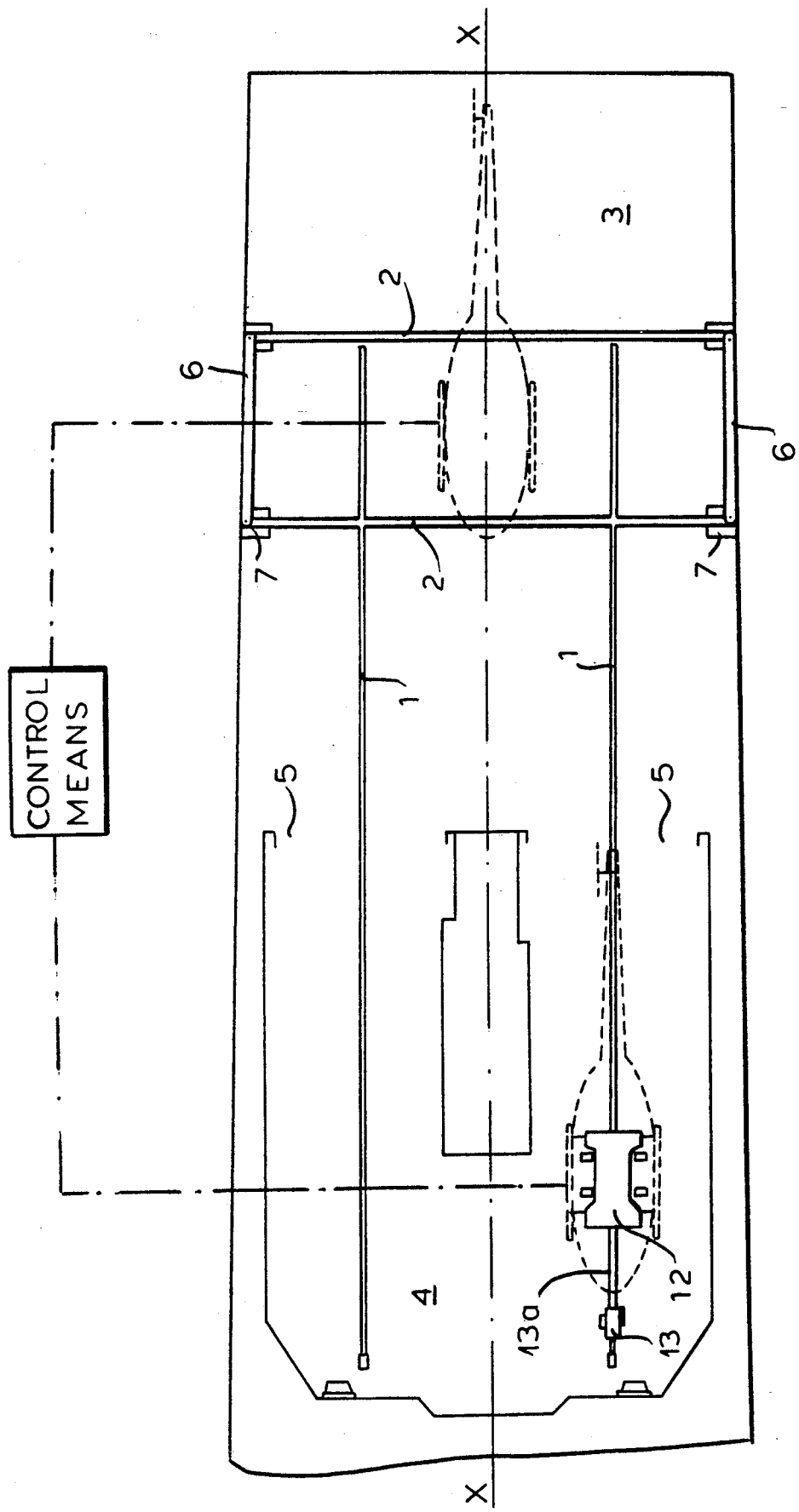
FIG. 1 is a diagrammatic plan view of the device for gripping and moving a skid-mounted helicopter according to this invention.

As seen in FIG. 1, the helicopter gripping and transporting device according to this invention consists essentially of a first pair of longitudinal rails 1 and of a second pair of transverse rails 2 made integral with deck 3 of the vessel, on which is also located hangars 4 driveway or entrances 5 to which are symmetrically aligned with each longitudinal rail 1.

Such rails shown in FIG. 2d are of substantially inverted "T" section in order to engage a corresponding sliding member and prevent it from becoming detached, as will be more fully described later.

At each end of the pair of transverse rails 2, which ends substantially coincide with the extreme edges of the deck, there is located a gripping beam 6, set parallel to the longitudinal axis of the vessel. The beam is formed with ends 6a which are made integral with a trolley 7 capable of running on the deck and, in turn, made integral by means of suitable links 7a (FIG. 2d) which prevent it from skidding, with rails 2.

Each trolley 7 is then operated independently of the other by means of cable-type unidirectional hauling devices (FIG. 2a) and including, in the example shown, two cables 8a, 8'a, one of which is a hauling cable and the other a trailing cable, both ending at two motor-driven winches 8b, 8'b located at the respective ends of the rails. This arrangement hauls the respective trolley in both directions, while the cables are always kept under tension. The movement of each pair of winches is furthermore independent of the movement of any other pair, and thus each end of gripping beam 6 is independently handled.

Each gripping beam is furthermore provided at one of its end with a prismatic unit 9 which can be used to extend the beam, as will be explained later. Additionally, at each end of the beams there is also fitted a hydraulic cylinder 20 which makes it possible to raise beam 6 at different levels with respect to the deck.

Figure 3A:
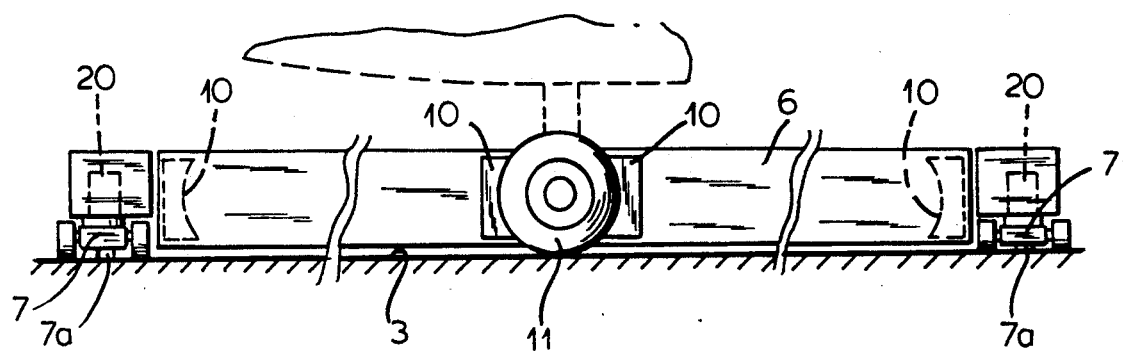
FIG. 3a is a diagrammatic elevational side view of the gripping unit used for wheel-mounted helicopters.
Figure 3B:
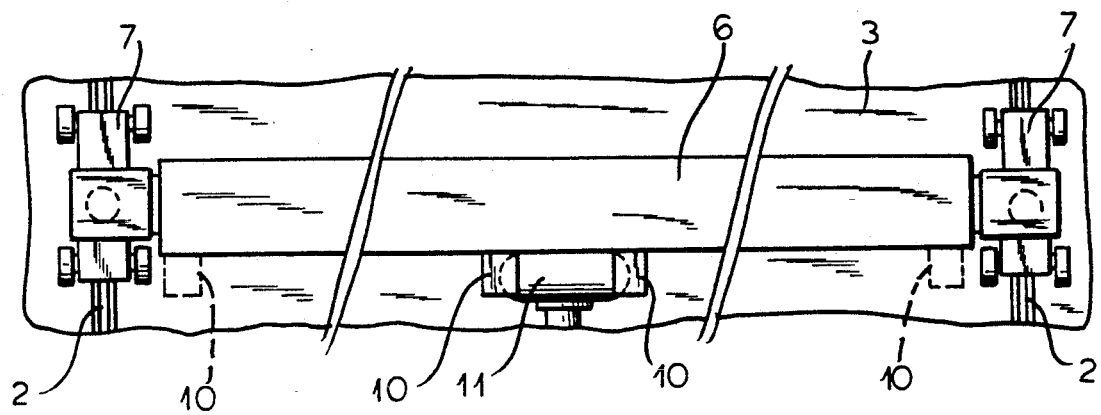

As shown in FIGS. 2a, 2b, 2c the gripping beams consist, in the case of skid-mounted helicopters, of substantially rectangular sections the inward-turned surface of which is provided with a groove 6c extending throughout the length thereof. The groove is designed to engage a mating member 17a projecting from skids 17 of the helicopter (FIG. 2c). In the case of a wheel-mounted helicopter, gripping beam 6 is provided instead with shoes 10, normally located at the ends of beam 6 and sliding thereon (FIG. 3a, 3b) by means of suitable drive units in order to engage wheels 11 of the helicopter and secure it.

Figure 4B:
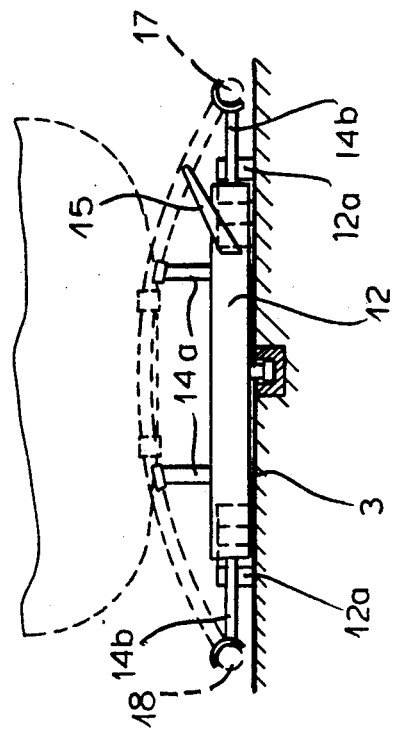
FIG. 4b is a front elevational view of the trolley shown in FIG. 4a attached to the helicopter.
Figure 4A:
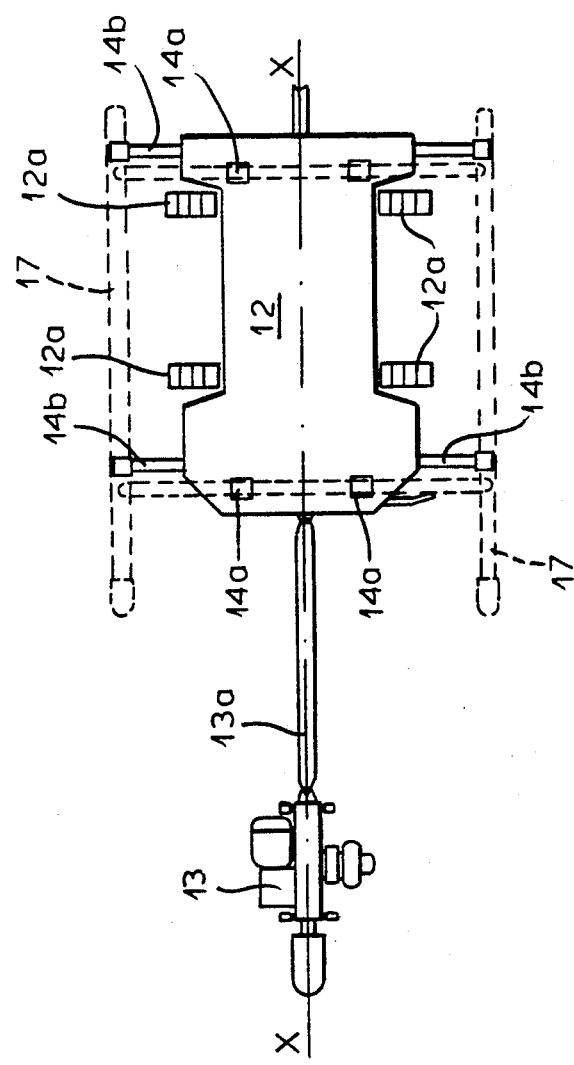
FIG. 4a is a plan view of the trolley used for holding and transporting a skid-mounted helicopter.

The device according to the invention is also provided with a longitudinal traversing system used for movement inside the hangar and substantially including a first gripping trolley 12 (FIGS. 4a, 4b) fitted with units for gripping the helicopter and capable of running on rubbertired idler wheels 12a under the pulling action of a second motor-driven trolley 13 linked to the former by a rigid bar 13a.

Both trolleys are also equipped with anti-skid links which are likewise integral with each longitudinal rail 1.

Gripping trolley 12 (FIGS. 4a, 4b), is used for skid-mounted helicopters, is fitted with four pairs of arms, two 14a of which are used for lifting the helicopter and two 14b for locking to prevent it from skidding.

Figure 3C:
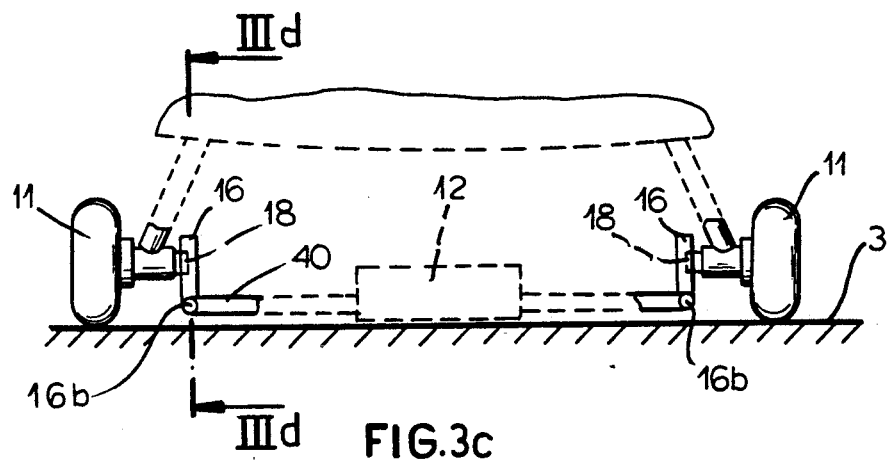
FIG. 3c is a detail of the gripping units integral with the longitudinal traversing trolleys, in the case of wheel-mounted helicopters.
Figure 3D:
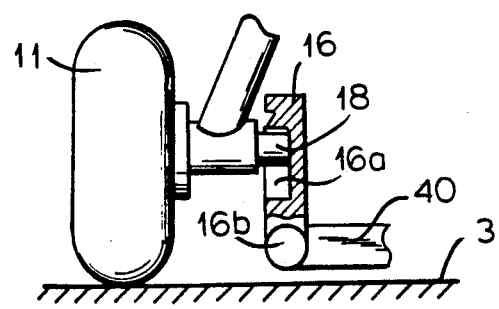
FIG. 3d is a cross-sectional view according to plotting plane IIId—IIId of FIG. 3c.

In the case of wheel-mounted helicopters (FIGS. 3c, 3d) gripping is carried out instead by two arms 16 rotating around a pin 16b integral with an arm 40 on gripping trolley 12. Such rotating arms 16 are provided with a slot 16a capable of engaging the relevant pins 18 projecting inwardly from helicopter wheel 11, in such a way that when trolley 12 is in position under the fuselage there are able to rotate upward arms 16 which, via slots 16a, engage pins 18 thus locking the helicopter. Trolley 12a is furthermore provided with an end-of-stroke arm 15 which signals the arrival at the correct position under the fuselage of the helicopter.

Lastly, the device according to the invention provides that each drive may be operated and controlled at a distance from the operator either manually or by means of automation programs.

Figure 6A:
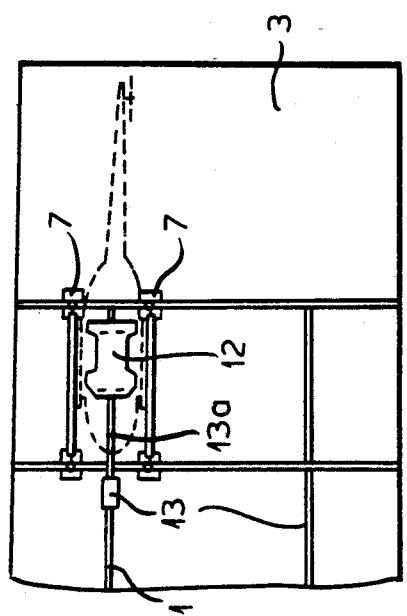
FIGS. 6a, 6b, 6c are shown similar to FIGS. 5 sequence for skid-mounted helicopters.
Figure 6B:
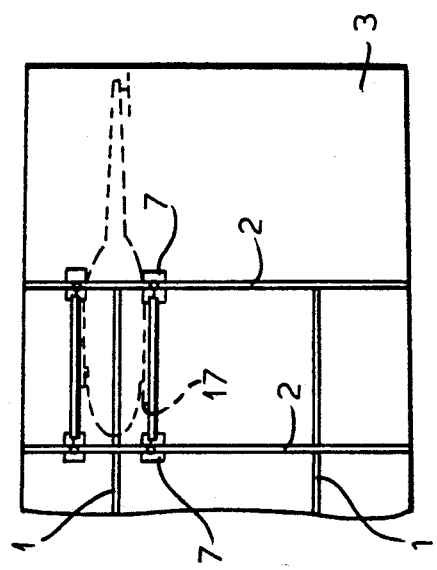
Figure 6C:
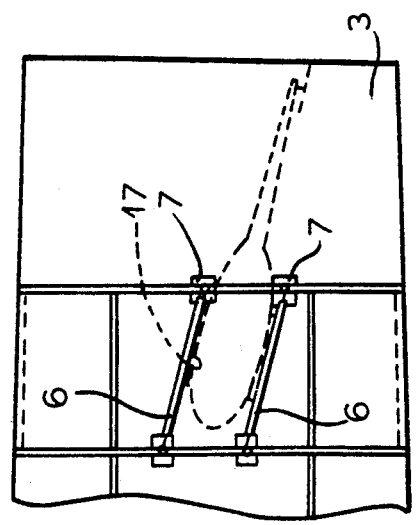

The operation of the device, for example in the case of the skid-mounted helicopter described with reference to FIGS. 6a, 6b, 6c is as follows: when the helicopter lands on deck 3 within the landing area, the operator positioned at a distance operates gripping beams 6, which undergo an initial stage of rapid approach until they reach the vicinity of skids 7; at this point a lifting and distance monitoring device, begins to provide information on the actual distance of each end of the gripping beam from the relevant skid, thus bringing about a change in the rate of advance of each of such ends. Therefore, should the helicopter be wheeled into position relative to the longitudinal axis of the vessel, the beams would rotate so as to make it possible to approach and grip the skids, always in a fully parallel position, any variation in length of beam 6 caused by the different movement of one end in relation to the other being compensated by the lengthening action of telescopic prismatic unit 9 at end 6b.

Once the helicopter has been secured, cylinders 20 slightly raise the gripping beams until the skids are no longer in contact with the deck, thus making it possible to commence the operation of maneuvering the helicopter and positioning it in line with the rail 1 corresponding to the preselected hangar.

When the helicopter is correctly positioned, motor-driven trolley 13 positions gripping trolley 12 under the fuselage of the helicopter in order to be able to operate arms 14a and 14b to lift and lock the helicopter. At this stage gripping beams 6 are released and return to the starting position, while motor-driven trolley 12 drives the helicopter into the hangar and is then made ready for a new cycle.

Figure 5A:
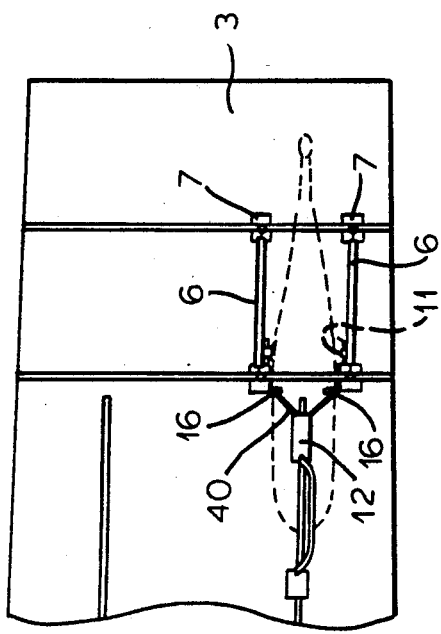
FIGS. 5a, 5b, 5c show diagrammatically the operating sequence of gripping, aligning and transporting a wheel-mounted helicopter from its landing position to its parking position within the hangar.
Figure 5B:
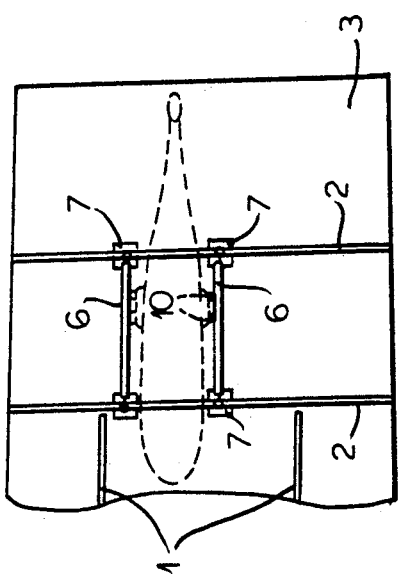
Figure 5C:
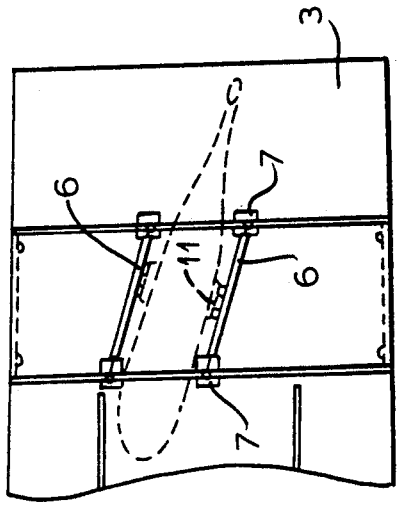

As illustrated in the sequence of FIGS. 5a, 5b, 5c the sequence is entirely similar in the case of wheel-mounted helicopters. In this case, however, when gripping beams 6 are close to wheels 11 shoes 10 perform the gripping action and, during the subsequent stages of maneuvering of the helicopter, are shifted in a coordinated movement relative to the rotation of beams 6, so as to maintain the longitudinal axis of the helicopter parallel to that of the beams.

Many variants may be introduced, without thereby departing from the scope of the invention is regard to is general features.

I claim:

1. A device for gripping and maneuvering a helicopter to a destination port, said device comprising:
    a longitudinal support surface;
    a pair of first spaced apart parallel longitudinal guides extending transversely to a longitudinal dimension of said surface;
    a pair of spaced apart parallel gripping beams bridging said first guides and operatively connected therewith, each of said beams being formed with respective first and second ends and being adapted to arrest the helicopter therebetween;
    a pair of first drive units displacing the first ends of said beams on one of the first guides;
    a pair of second drive units displacing the second ends of said beams on the other of said first guides, said first and second drive units being independent from one another and adapted to pivot said beams parallel to said surface between an angular position straddling a landing area for receiving the helicopter to a normal position corresponding to a position of said beams parallel to said longitudinal dimension;

gripping means on said pair of gripping beams for gripping said helicopter in said landing area;

lifting means for elevating said pair of beams from said surface to selectively engage and disengage the helicopter with said gripping means;

a pair of second longitudinal guides on said surface extending parallel to said longitudinal dimension and crossing said first guides, each of said second guides being located between said gripping beams in a respective normal position thereof with said helicopter aligned with the respective longitudinal guide of the second pair of guides;

locking means on each of said second longitudinal guides for locking the helicopter upon displacing said gripping beams in said normal position;

displacing means operatively connected with said locking means for maneuvering the helicopter to the destination port along each of said second guides; and controlling means for sequentially operating said gripping, lifting, locking and displacing means.

2. The device defined in claim 1 wherein said pair of first drive units includes;

a pair of first trolleys and a pair of second trolleys, each pair of first and second trolleys being slidably mounted on a respective one of said pair of first longitudinal guides;

respective pairs of hauling and trailing cables operatively connected with respective first and second trolleys; and a pair of first winches on the first longitudinal guide and a pair of second winches on the second longitudinal guide for actuating respective hauling cables, each of said pair of gripping beams being provided with a respective telescoping means on a respective one of said first and second ends for extending the respective gripping beam generally along said longitudinal direction, each of said locking means includes a respective carriage movable along a respective one of said second longitudinal guides.

3. The device defined in claim 1 wherein said lifting means is hydraulically operated.

4. The device defined in claim 2 wherein each of said first and second guides is a rail of inverted T-shape, each of said trolleys and each of said carriages being formed with means forming a respective T-shaped element engaging the respective one of said rails.

5. The device defined in claim 1 wherein said gripping means includes a plurality of supports, each of said supports being mounted on a respective one of said first and second ends of said pair of gripping beams and having a respective substantially rectangular cross-section.

6. The device defined in claim 5 wherein each of said supports mounted on one of the gripping beams is formed with a respective inner side facing another support mounted on the respective end of the other one of the gripping beams, each of said inner sides being provided with a respective groove receiving a respective skid of the helicopter.

7. The device defined in claim 6 wherein each of said inner sides is provided with a respective shoe extending toward a respective inner side of the other support mounted on the other gripping beam and engaging a respective wheel of the helicopter.

8. The device defined in claim 1 wherein said displacing means includes two motors, each of said motors being rigidly connected with and driving a respective one of said locking means.

9. The device defined in claim 8 wherein each of said locking means is provided with:

two respective pairs of arms extending laterally outwardly toward and engaging the skids of the helicopter, and respective elevating means for raising the helicopter upon engaging the helicopter with said arms.

* * * * *

UNITED STATES PATENT AND TRADEMARK OFFICE
CERTIFICATE OF CORRECTION

PATENT NO. : 5,248,115
DATED : 28 September 1993
INVENTOR(S) : Aurelio ORTELLI

It is certified that error appears in the above-indentified patent and that said Letters Patent is hereby corrected as shown below:

On the title page, under item [19], change "Aurelio" to --Ortelli-- and item [75], change "Ortelli Aurelio" to --Aurelio Ortelli--.

Signed and Sealed this

Nineteenth Day of April, 1994

Attest:

BRUCE LEHMAN

*Attesting Officer*  *Commissioner of Patents and Trademarks*